United States Patent [19]

Guzikowski

[11] Patent Number: 5,061,165
[45] Date of Patent: Oct. 29, 1991

[54] MOLDING TOOL

[75] Inventor: Gary R. Guzikowski, Franklin, Wis.

[73] Assignee: Kelch Corporation, Cedarburg, Wis.

[21] Appl. No.: 609,950

[22] Filed: Nov. 6, 1990

[51] Int. Cl.[5] ............... B29C 33/24; B29C 41/20
[52] U.S. Cl. .................... 425/117; 249/91;
249/97; 425/DIG. 29; 425/DIG. 38
[58] Field of Search .............. 249/95, 91, 96, 97,
249/93, 94; 264/259, 261; 425/111, 123, 117,
400, DIG. 29, DIG. 38, 435, 429; 279/79, 97

[56] References Cited

U.S. PATENT DOCUMENTS

| 2,370,487 | 3/1943 | Poutie | 279/79 |
|---|---|---|---|
| 3,685,782 | 8/1972 | Kowell | 249/97 |
| 3,685,783 | 8/1972 | Hilson | 249/97 |
| 3,924,493 | 12/1975 | Penner | 279/49 |
| 4,053,134 | 10/1977 | Peacock | 249/97 |
| 4,167,379 | 9/1979 | Liautand | 425/111 |
| 4,558,620 | 12/1985 | Wallis | 279/79 |

OTHER PUBLICATIONS

Modern Plastics Encyclopedia 1989, "Rotational Molding", pp. 296 and 301.
"Rotospeed Rotational Molding Machines", Ferry Industries, Inc. 12 pages.
Catalog page "Faspin Model C", Aerofast, Inc.
Camloc Fasteners, Master Catalog No. 89, p. E12.
Two photographs marked Applicant's Exhibit 4a and 4b showing rotational mold and molded part.

Primary Examiner—Jay H. Woo
Assistant Examiner—Khanh P. Nguyen
Attorney, Agent, or Firm—Quarles & Brady

[57] ABSTRACT

A tool for holding threaded inserts in a rotational mold includes a stud which projects within the mold cavity and which has a diameter substantially equal to the minor diameter of the threads of the insert. A spring loaded detent on the stud is received by the internal threads of the insert for holding the insert firmly against the inner wall of the mold yet permitting simple removal of the molded part. A retractor mechanism for using the tool with threaded inserts placed across the axis of removal of the molded part, is also taught.

5 Claims, 2 Drawing Sheets

MOLDING TOOL

BACKGROUND OF THE INVENTION

1. Field Of The Invention

The invention relates to molds for forming molded parts with threaded inserts. More particularly, it relates to a molding tool adapted to releasably hold such inserts in place during the molding process.

2. Background of the Art

Metal threaded inserts are frequently incorporated into plastic components to receive standard machine screws. A threaded insert typically has a metal cylindrical body with an axially bored and threaded hole. The outer surface of the cylinder may include a series of knurled ridges or grooves to improve the adhesion between the threaded insert and the associated plastic part.

The threaded insert has a larger diameter than the machine screw it accepts and thus provides increased resistance to torque and pullout force generated by the machine screw at the attachment point on the plastic part. The threads of the threaded insert are superior to threads formed directly in the plastic part for resisting "stripping" and "cross-threading".

In one known molding process, a powder or liquid polymer is introduced to a closed, mold cavity defining the outer surface of a desired molded part. Typically, and as will be assumed henceforth, the polymer is a thermoplastic. However other materials, most notably thermoset materials, may also be used.

After the thermoplastic is introduced to the mold, the mold is heated and rotated simultaneously about two perpendicular axes. The relative speeds of the axes differ, for example, by four to one, so that the thermoplastic material, as it melts, forms a layer of uniform thickness over the entire inner surface of the mold cavity. The mold is then cooled and the finished molded part removed. The rotational molding process does not require the high-pressure flow of plastic or produce high shear pressures on the mold components. The result is that, for some applications, the molds for rotational molding are simpler, less expensive, and longer lasting than molds used with other processes, such as injection molding.

In the past, when threaded inserts have been incorporated in a rotationally molded part, they have been first fastened against the inner surface of the mold cavity by machine screws passing through the wall of the mold and received by the threaded bores of the inserts. After the molded part has cooled, the restraining machine screws are unscrewed completely and then withdrawn out of a mold housing wall to permit the molded part to be unloaded. If many threaded inserts are included in a molded part, the removal of the restraining screws in the unloading process becomes burdensome and expensive. Complicating matters, various arrangements must be made to hold the screws and related fasteners while the formed piece is removed.

Thus, it can be seen that a need exists for an improved molding tool.

SUMMARY OF THE INVENTION

The present invention provides a molding tool for securing threaded inserts within a rotational mold or the like and permitting rapid unloading of the mold once the molded part has been formed.

Specifically, in a mold having a housing wall defining an internal molding cavity, a stud extends into the mold cavity from the housing wall. A detent protrudes from the stud, biased retractably in the transverse direction away from a longitudinal axis of the stud, so that the internal threads of the threaded insert may be releasably retained by the detent when the bore of the threaded insert is placed over the stud.

The stud may extend through the housing wall to be held by a retractor for withdrawing the stud from the mold cavity.

The detent permits the threaded insert to be slipped on and off of the stud for convenience of loading and unloading the mold and yet prevents the threaded insert from becoming displaced during the molding process. The combination of the above described stud and the retractor mechanism permit simple unloading of a molded part having threaded inserts even when the threaded inserts are not aligned with the direction along which the molded part is released from the mold.

The objects of the invention therefore include:

a) reducing time required to unload from a mold a molded part having threaded inserts, and to position inserts in the mold for the next cycle;

b) providing simple, accurate and positive positioning of a threaded insert within a mold; and c) providing the above advantages with threaded inserts positioned at angles to the direction of the release of the molded part.

Other objects and advantages besides those discussed above will be apparent to those skilled in the art from the description of the preferred embodiment of the invention which follows. In the description, reference is made to the accompanying drawings, which form a part hereof, and which illustrate one example of the invention. Such example, however, is not exhaustive of the various alternative forms of the invention. Therefore, reference should be made to the claims which follow the description for determining the full scope of the invention.

DESCRIPTION OF THE PREFERRED EMBODIMENT

Figure 1:
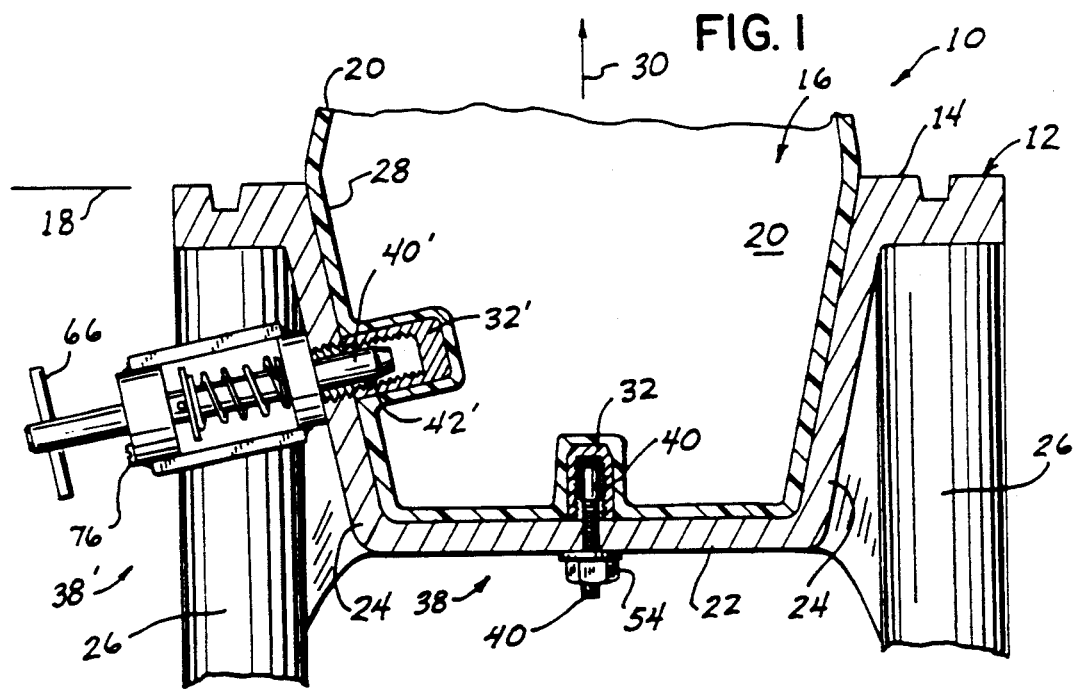
FIG. 1 is a cross-sectional view of a rotational mold showing two threaded inserts, a first aligned with the direction of release of the molded part and a second generally perpendicular to the first.

Referring to FIG. 1, a rotational mold 10 includes a first mold half 12 having a keyed rim 14 for fitting against a second half (not shown) to form a mold cavity 16. The keyed rim 14 defines a parting plane 18 away from which the mold halves separate for removal of the molded part 20 as will be described. The first mold half 12 includes a bottom planar wall 22 surrounded by four box-like upstanding sidewalls 24. The sidewalls 24 cant outward from each other so as to provide draft as is generally understood in the art.

Two opposing sidewalls 24 hold support legs 26 on their outer surfaces which tie to a carriage (not shown) that rotates the mold 10 about the two perpendicular axes during the molding process. Prior to the rotation of the mold 10, a thermoplastic material 28 is introduced to the mold cavity 12 which can be heated. The rotation of the mold 10 and heat distributes and joins the thermoplastic material 28 in a layer over the inside surface of the mold cavity 12. After the thermoplastic material 28 has been uniformly distributed, the mold 10 is cooled and the thermoplastic material solidifies to produce the hollow molded part 20 conforming to the dimensions of the mold cavity 12.

The mold halves are separated and the cooled and solidified molded part 20 is removed from the mold 10 along a release direction 30 generally perpendicular to the plane of the bottom wall 22 of the mold 10.

Figure 2:
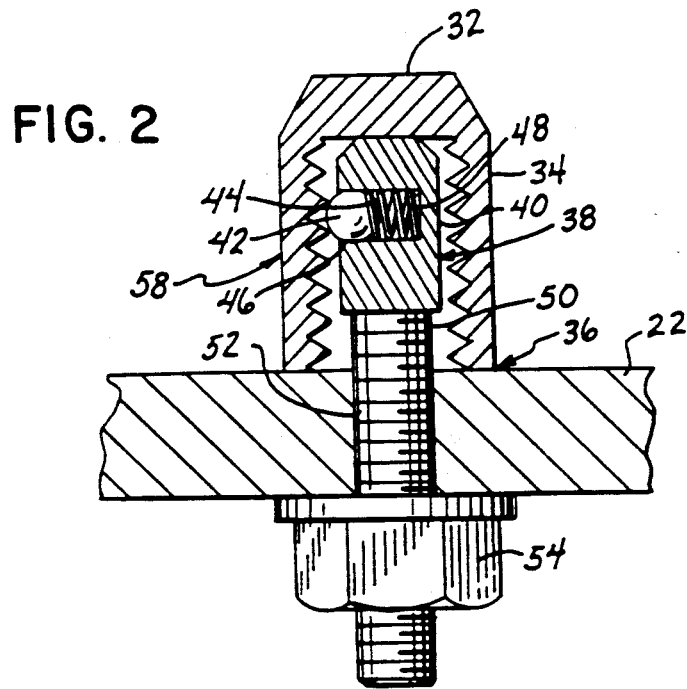
FIG. 2 is an enlarged view of the bottom central portion of FIG. 1.

Referring to FIG. 2, a cylindrical threaded insert 32 has a threaded blind bore 34 along the axis of the cylinder. It is sized to receive standard machine screws (not shown) when the formed part is used. The bored face 36 of the threaded insert 32 is held against the inner surface of the bottom wall 22 of the mold 10 by an assembly 38 having a stud 40 projecting parallel to the release axis 30 from the bottom planar wall 22 of the mold 10. The upper edge of the stud 40 is chamfered to permit readily location of the threaded insert 32 on the stud 40 and to prevent catching of the threads 34 of the threaded insert 32 by that upper edge.

A detent ball 42 fits within a well 44 bored in one wall of the stud 40 so as to permit the detent ball 42 to slide in a direction generally perpendicular to the length of the stud 40. The outer lip of the well 44 forms a restriction 46 preventing the detent ball 42 from entirely escaping from the well 44 but permitting the detent ball 42 to project slightly outward from the surface of the stud 40. A helical compression spring 48 fits between the inner surface of the detent ball 42 and the bottom of the well 44 to bias the detent ball 42 outward from the center of the stud 40. The ball is free to rotate.

The stud 40 can be an integral part of the mold tool or, as shown, it can be attached to the bottom wall 22 by means of external threads 50 cut into its lower portion which permit the lower portion of the stud 40 to be received by similar mating threads cut in a hole 52 in the bottom wall 22. A lock nut 54 is placed on the lower portion of the stud 40 at a point where it extends outside of the bottom wall 22. The nut is tightened against the outer surface of the bottom wall 22 to limit rotation of the stud 40.

When the insert 32 is placed over the stud 40, the detent ball 42 is forced inward into the stud 40 and presses outward against the threaded bore 34. The threaded bore 34 is frictionally against the stud 40 along the opposite wall of the stud 40 from that at which the detent ball 42 protrudes. The detent ball 42 is sized so that axial motion of the threaded insert 32 with respect to the stud 40 forces the detent ball 42 into the well 44 against the compression of the spring 48, this required "work" further restraining the threaded insert 32 against axial motion.

Figure 5:
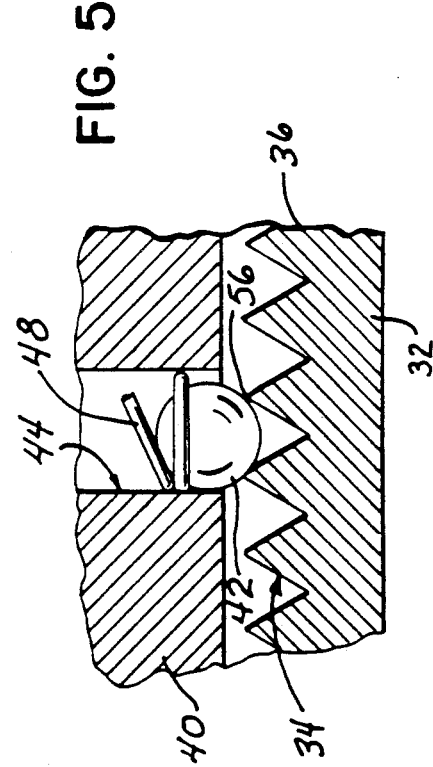
FIG. 5 is a detailed view of the ball of FIGS. 2 and 3 showing the relative position of the ball and the internal threads of the threaded insert.

Referring to FIG. 5, the detent ball 42 will tend to position the threaded insert 32 so that the detent ball 42 rests between the crests 56 of two adjacent threads. When the threaded insert 34 is initially so positioned, its face 36 may be spaced away from the bottom wall 22 of the mold 10. If so, the threaded insert 32 may be rotated clockwise by one turn or less to bring its face 36 tightly against the bottom wall 22, the detent ball 42 serving effectively as a single mating thread. Note that the rotation of the ball and the presence of the spacing reduces the chance of the threads being stripped as the ball passes over them.

Once the threaded insert 32 is positioned over the stud 40, the thermoplastic material 28 is placed in the mold cavity 12 and heated. Rotation of the mold 10 distributes a layer of thermoplastic 28 along the inner face of the mold 10, except where the face 36 of the threaded insert 32 presses against the bottom wall 22, and over the outer surface of the threaded insert 32 thereby attaching the threaded insert 32 firmly to the molded part 20. The outer circumference of the threaded insert 32 has a knurled pattern 58 to increase its adhesion to the thermoplastic 28 of the molded part 20. The rotational molding process does not subject the threaded inserts 32 to large dislocating forces, as would be the case in injection molding for example, and hence the force of the compression spring 48 acting on the detent ball 42 and hence on the threaded bore 34, need not be large in order to adequately hold the threaded insert 32 in place during the molding process.

When the mold 10 and thermoplastic material 28 have cooled, the mold halves are separated and the molded part 20 removed along the release axis 30. As will be apparent from the above description of the mold tool 38, as the molded part 20 is removed, the detent ball 42 will retract in response to the axial movement of the threads 34 to permit the threaded insert 32 to slide off of the stud 40 along the release axis. The molding tool 38 thus eliminates the time consuming process of unbolting studs from the mold 10 as was previously required.

Referring again to FIGS. 1 and 3, the threaded insert 32' may be positioned against one of the side walls 24 of the mold 10. In this case, the axis of the stud 40' will not be parallel to the release axis 30 to permit removal of the molded part 20 without removal of the mold tool 38'.

Figure 3:
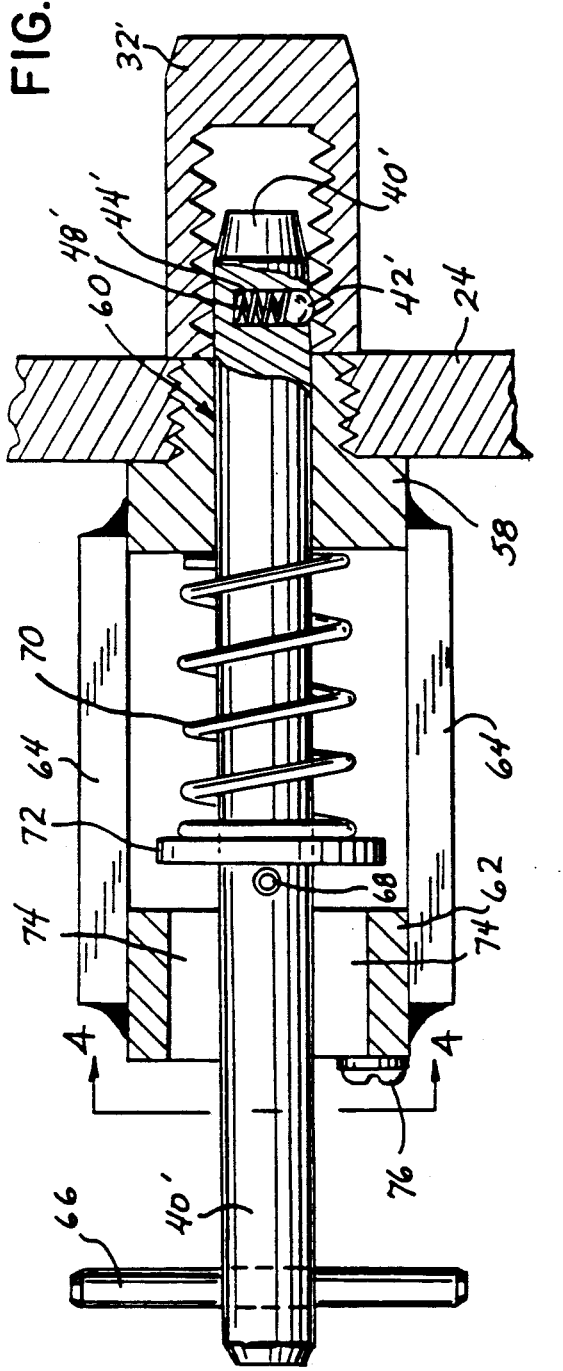
FIG. 3 is a detailed cross-section of the tool holding the second insert including a retractor mechanism.

Accordingly, the mounting of the stud 40' is modified to permit it to be retracted easily from the mold cavity 12 after the molded part 20 has cooled, and hence to permit removal of the molded part 20 without the laborious unfastening of a retaining screw holding the threaded fastener 32, as has been previously required. Referring to FIG. 3, a bushing 58 is threaded into the side wall 22 of the mold 10. The bushing 58 provides an opening 60 through the side wall 22 with a diameter equal to the diameter of the stud 40' permitting the stud 40' to slide into and out of the mold cavity 12 within the opening 60.

That part of the stud 40' extending into the mold cavity 12 is the same as stud 40 as that has been previously described, having a radial well 44' holding a detent ball 42', the latter projecting radially from the surface of the stud 40' and biased outward by a compression spring 48' captured between the detent ball 42' and the bottom of the well 44'.

The portion of the stud 40' removed from the detent ball 42' slides within the opening 60 created by bushing 58 and extends outside of the mold 10 to be received by a second bushing 62 coaxial with the first bushing 58 and rigidly attached to the first bushing 58 by means of spacer bars 64. At the far end of the stud 40' away from the mold cavity 12 and past the second bushing 62, a bar is inserted radially through the stud 40' to form a T handle 66 to permit the stud 40' to be rotated within the bushings 62 and 58 and extended into or retracted out of the mold cavity 12.

A key pin 68 projects radially on either side of stud 40 and through the stud 40' at a point along the length of stud 40' just inside the second bushing 62 with respect to the mold 10 when the stud 40' is fully extended into the mold cavity 12 for receiving the threaded insert 32'. This position of the stud 40' will be termed the "closed position".

A helical compression spring 70 surrounds the portion of the stud 40' between the first and second bushings 58 and 62 and presses at one end against the outer surface of the first bushing 58 and at the other end against a washer 72 which in turn presses against the projecting length of key pin 68 so as to bias the stud 40' away from the mold cavity 12. In the closed position, the stud 40' is prevented from retracting completely from the mold cavity 12, despite this biasing of the compression spring 70, by the restraining influence of the inner surface of the second bushing 62 against which the key pin 68 fits.

Figure 4:
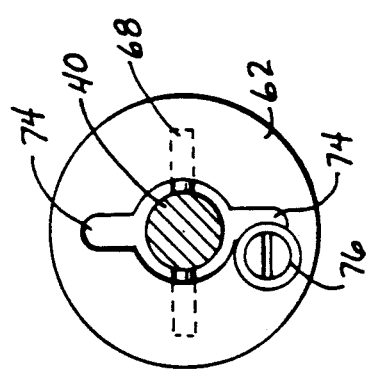
FIG. 4 is a cross-sectional view along line 4—4 of FIG. 3.

Referring to FIG. 4, the second bushing 62 contains a slot 74 with dimension larger than the projection of the key pin 68 on the second bushing 62 along the axis of the stud 40' when the stud is in a releasing rotational position. Accordingly, when the stud 40' is rotated so that the slot 74 and key pin 68 align, the key pin 68 may slip into the slot 74 in the second bushing 62 and the stud 40' is retracted completely from the mold cavity 12. This retracted position is termed the "open position".

The effect of the compression spring 70 is to prevent casual rotation of the stud 40', when in the closed position, by ensuring frictional contact between the key pin 68 and the inner surface of the second bushing 62. Once the key pin 68 passes through the second bushing 62, the biasing effect of the spring 70 ceases as the spring 70 is restrained by the washer 72 which rests against the inner surface of the second bushing 68. The stud 40' may be fully retracted from the mold cavity 12 by pulling it along the stud axis with the T handle 66 until the key pin 68 has traveled the length of the bushing 62 into the slot 74. The stud 40' may not be pulled further because the key pin 68 is restrained in the slot 74 by the head of retention screw 76 which covers the exit of the slot 74 at the outside surface of the second bushing 62. The retention screw 76 prevents the stud 40' from being disconnected from the mold 10 and lost.

Referring to FIGS. 1 and 3, the stud 40' is extended into the mold cavity 12 by pressure against the T handle 66 to push the key pin 68 down through the slot 74 in the second bushing 62 against the force of the spring 70. The T handle 66 is then given a quarter turn to lock the key pin 68 beneath the second bushing 62 and to properly extend the stud 40' into the mold cavity 12. The threaded insert 32' may be placed on the extending stud 40' and given a single turn or less to draw it tightly against the inner surface of the side wall 24.

Thermoplastic material 28 is then introduced into the mold cavity 12 and the molding process performed. When the mold 10 is cool, the T handle 66 is given a second quarter turn and the stud 40' withdrawn from the mold cavity 12 and the threaded insert 32. The detent ball 42' permits the stud 40' to be so withdrawn without additional rotation. With the stud 40' fully withdrawn from the mold cavity 12, the molded part 20 may be removed from the mold half 12 along the release axis 30 without interference from the stud 40'. This alternative embodiment permits molded parts 20 having threaded inserts 32' which are not aligned with the release axis 30 to be unloaded with only a simple quarter turn of the T handle 66 as opposed to the more laborious removal of a retaining screw as was previously used.

The above description has been that of a preferred embodiment of the present invention. It will occur to those who practice the art that many modifications may be made without departing from the spirit and scope of the invention. In order to apprise the public of the various embodiments that may fall within the scope of the invention, the following claims are made.

I claim:

1. A molding tool for use in a mold having a wall defining an internal molding cavity, the tool being configured to hold an insert having a threaded internal bore within the mold cavity, the improvement comprising:
    a stud extending into the mold cavity from the housing wall;
    a detent transversely and retractably protruding from the stud; and
    means biasing the detent in the transverse direction away from a longitudinal axis of the stud whereby the stud, housing wall, detent and means are juxtaposed and configured so that the internal threads of the threaded insert are releasably retained by the detent when the bore of the threaded insert is placed over the stud.

2. A molding tool according to claim 1, wherein the stud extends through the housing wall.

3. A molding tool according to claim 1, wherein the detent is a ball partially retained in a well in the stud, and wherein the biasing means is a compression spring positioned between the ball and a wall of the well.

4. A molding tool according to claim 1, further comprising:
    a resiliently biased retractor extending through the housing wall attached to the stud for withdrawing the stud from the mold cavity.

5. The molding tool of claim 4, wherein the retractor is placed in a first position which holds the stud in the mold cavity, and is rotated to a second position to cause the stud to move at least partially outward through the housing wall in response to spring pressure.

* * * * *